US006779728B2

(12) United States Patent
Nomiyama et al.

(10) Patent No.: US 6,779,728 B2
(45) Date of Patent: Aug. 24, 2004

(54) BANKNOTE RECEIPT AND PAY-OUT APPARATUS

(75) Inventors: Akira Nomiyama, Kashiwa (JP); Shinji Shibata, Nagoya (JP); Masanori Terao, Owariasahi (JP); Riichi Katou, Nagoya (JP); Shigeru Sasaki, Tomobe (JP)

(73) Assignee: Hitachi, Ltd., Tokyo (JP)

( * ) Notice: Subject to any disclaimer, the term of this patent is extended or adjusted under 35 U.S.C. 154(b) by 38 days.

(21) Appl. No.: 10/238,733

(22) Filed: Sep. 11, 2002

(65) Prior Publication Data

US 2003/0047601 A1 Mar. 13, 2003

(30) Foreign Application Priority Data

Sep. 11, 2001 (JP) ....................................... 2001-274401
Apr. 10, 2002 (JP) ....................................... 2002-107274

(51) Int. Cl.[7] ................................................ G06K 13/24
(52) U.S. Cl. .......................... 235/485; 235/379; 902/15
(58) Field of Search ................................ 235/475, 379, 235/485, 486; 902/9, 12, 13, 14, 15

(56) References Cited

U.S. PATENT DOCUMENTS 4,113,140 A * 9/1978 Graef et al. ................... 221/6
4,597,340 A * 7/1986 Huckle ......................... 109/45
5,597,996 A * 1/1997 Flood ......................... 235/379
6,536,761 B2 * 3/2003 Mochizuki et al. .......... 271/208
6,622,911 B1 * 9/2003 Holland-Letz et al. ...... 235/379

OTHER PUBLICATIONS

JP–A–2000–143074.

* cited by examiner

*Primary Examiner*—Karl D. Frech
(74) *Attorney, Agent, or Firm*—Antonelli, Terry, Stout & Kraus, LLP

(57) ABSTRACT

A banknote receipt and pay-out apparatus of a recirculation type for using received banknotes as those to be paid out, which can maintain the alignment of banknotes in a receipt and pay-out box in order when the latter is installed on the banknote receipt and pay-out apparatus which can deal with banknotes having different sizes, or when the receipt and pay-out box in which the banknotes are set is transported. That is, the banknote receipt and pay-out apparatus incorporating a receipt and pay-out box for replenishing the apparatus with banknotes, recovering banknotes therefrom, and storing banknotes in a standing posture, the receipt and pay-out box comprising an alignment mechanism for holding the banknotes aligned in order around the widthwise center thereof when the banknote receipt and pay-out box is not installed on the banknote pay-out apparatus.

12 Claims, 14 Drawing Sheets

BANKNOTE RECEIPT AND PAY-OUT APPARATUS

BACKGROUND OF THE INVENTION

The present invention relates to a banknote receipt and pay-out apparatus which can utilize received banknotes as those to be paid.

An automatic teller machine which is used in a financial organism or the like, is incorporated therein with a banknote receipt and pay-out machine having the so-called banknote receipt and payment box which stores therein received banknotes and dispenses the banknotes as those to be paid during pay-out in order to circulate banknotes in use.

JP-A-2000-143074 discloses an apparatus for aligning banknotes within a banknote receipt and pay-out box in such a case that differences are present between the inter-side wall space width of the banknote receipt and pay-out box and the dimensions of the banknotes, that is, an aligning guide is extended upon receipt of banknotes so as to adjust the inter-side wall space width of the banknote receipt and pay-out box to the dimensions of the banknotes in order to align and store the banknote therein, but the aligning guide is retracted upon pay-out of the banknotes in order to prevent obstruction to the pay-out of the banknotes.

These days, as ATMs have been widespreadly used, there has been a glowing need for miniaturizing the banknote receipt and pay-out machine, reducing the cost thereof, and enhancing the facility of use thereof while the function and performance thereof are maintained as it is. Meanwhile, there has been demanded an apparatus which can deal with various kinds of banknotes used through not only a domestic currency but various foreign currencies since kinds of banknotes through foreign currencies are increased in one country, and further, there has been a growing need for using a banknote receipt and pay-out apparatus in a foreign country.

SUMMARY OF THE INVENTION

In the case of dealing with banknotes in foreign currencies, the following matters have to be taken into consideration, that is, the number of denominations becomes larger than that in the domestic currency, and as well, the dimensions of banknotes or the long sides and short sides thereof, are comparatively different from one another among these denominations with a high degree of possibility. In the case of dealing with banknotes having dimensions which are greatly different from one another in one and the same machine, the width of a transfer path has to be increased in accordance with banknotes having a large size, and accordingly, banknotes having small sizes should be transferred on a transfer path having a large width. As a result, the bank-note receipt and pay-out box for storing banknotes having a small size inevitably has a width of a take-in/out slot and an inter-side wall space width which are large similar to the width of the transfer path. Thus, the difference between the width of the banknotes and the inter-side wall space width of the banknote receipt and pay-out box becomes larger than that of the conventional one.

It is considered that there are two kinds of banknote receipt and pay-out boxes which are used for a single size (single denomination) and for various sizes (various denominations). The banknote receipt and pay-out box for a single size in which banknotes in a single denomination are stored, has an inter-side wall space width which is larger than the width of the banknotes, and accordingly, when a person in charge brings over it, the banknotes would slip within the banknote receipt and pay-out box. Further, the banknote receipt and pay-out box for various denominations has an inter side wall space width which corresponds to a width of banknotes having a largest size, and accordingly, banknotes having a size smaller than that of the former would slip within the banknote receipt and pay-out box.

Thus, should the difference between the size of banknotes and the inter-side wall space width of the banknote receipt and pay-out box be large, the banknotes would be piled up in disorder, or the banknotes would becomes out of order when a person in charge or the like brings over the banknote receipt and pay-out box. Thus, the banknotes could not be properly paid out even after the banknote receipt and pay-out box is installed on the banknote receipt and pay-out machine.

However, in the above-mentioned conventional examples, no consideration has not yet been taken for ensuring the alignment ability of banknotes within the banknote receipt and pay-out box in the case of ransom oscillation as is caused during handling of the banknote receipt and pay-out box.

Accordingly, an object of the present invention is to provide a banknote receipt and pay-out apparatus which deals with banknotes having variously different sizes, which installs thereon a banknote cassette or a banknote receipt and pay-out box for receiving and paying out banknotes, and which can maintain the alignment of banknotes and can ensure stable storage and discharge for the banknotes in the case of storing the banknote into the banknote receipt and pay-out box or in the case of carrying the banknote receipt and pay-out box in which the banknotes are stored in alignment.

To the end, according to the present invention, there is provided a banknotes receipt and pay-out apparatus incorporating a banknote receipt and pay-out box for replenishing the apparatus with banknotes, restoring banknotes from the apparatus, and for storing therein the banknotes in a standing posture, wherein the banknote receipt and pay-out box incorporates a bank-note alignment mechanism for aligning and holding banknotes in a substantially widthwise center part within the banknote receipt and pay-out device when the banknote receipt and pay-out box has not yet been installed on the banknote receipt and pay-out apparatus.

Detailed explanation will be hereinbelow made of preferred embodiments of the present invention with reference to the accompaying drawings in which:

DESCRIPTION OF THE PREFERRED EMBODIMENTS OF THE INVENTION

An embodiment of the present invention will be explained with reference to the drawings.

Figure 12:
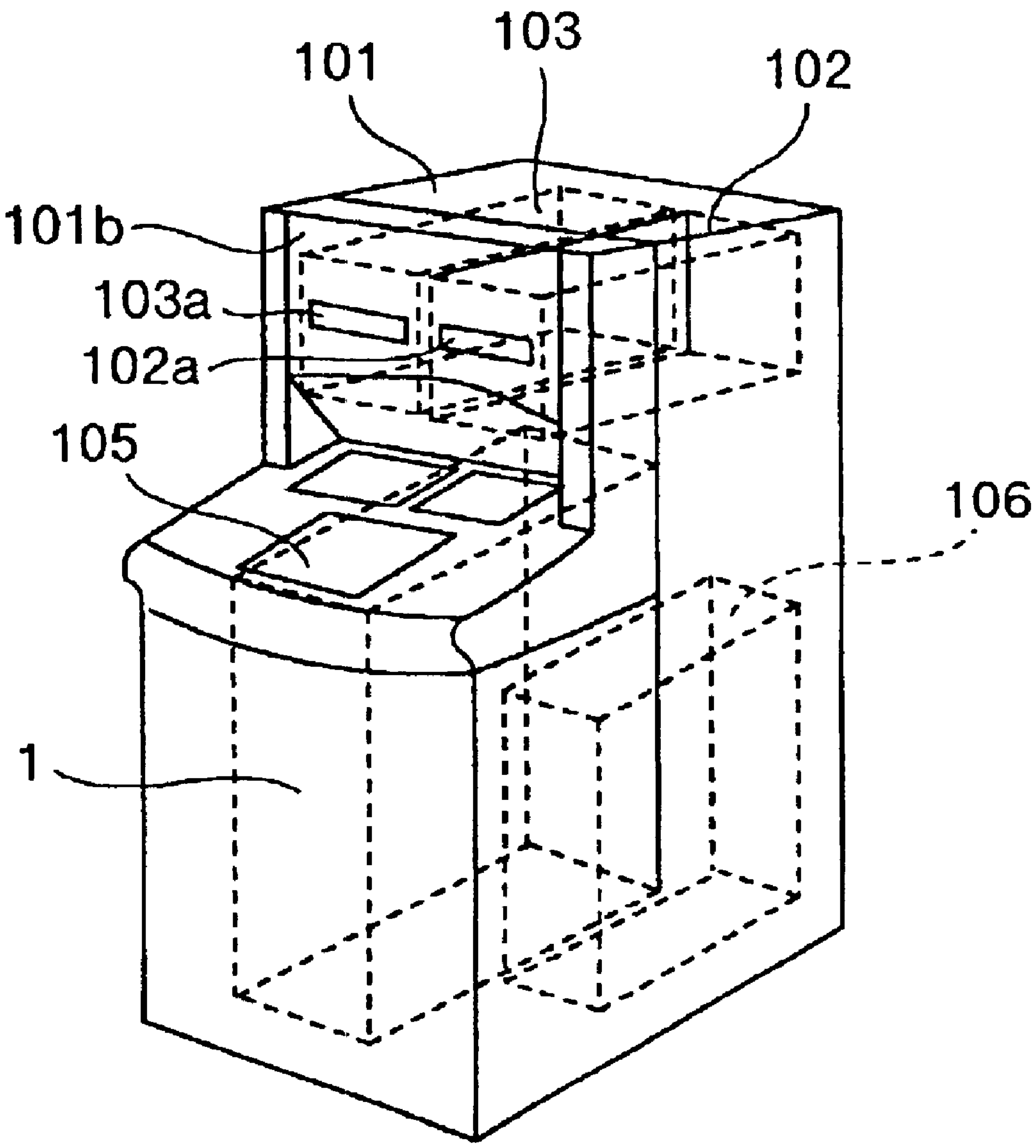
FIG. 12 is a perspective view schematically illustrating an automatic teller machine.

Referring to FIG. 12 which is a perspective view illustrating an automatic teller machine applied therein with the present invention, the automatic teller machine includes a body housing 101 a card/slip processing mechanism 102 communicated with a card slot 102*a* formed in a top front panel 101*b* of the housing 101, for processing a card inserted by a user, printing a transaction on a slip and dispensing the same, and a bankbook processing mechanism 103 communicated with a bankbook slot 103*a*, for processing a bankbook inserted by a user, the mechanisms 102 and 103 being accommodated in the upper part of the housing 101.

Further, the automatic teller machine includes a banknote receipt and pay-out apparatus 1 accommodated in the lower part of the housing 101, for dealing with banknotes, a user final control portion 105 accommodated in the middle part of the housing 101, for displaying and inputting a content of a transaction, and a central control portion 106 for controlling the operation of the overall automatic teller machine.

Figure 13:
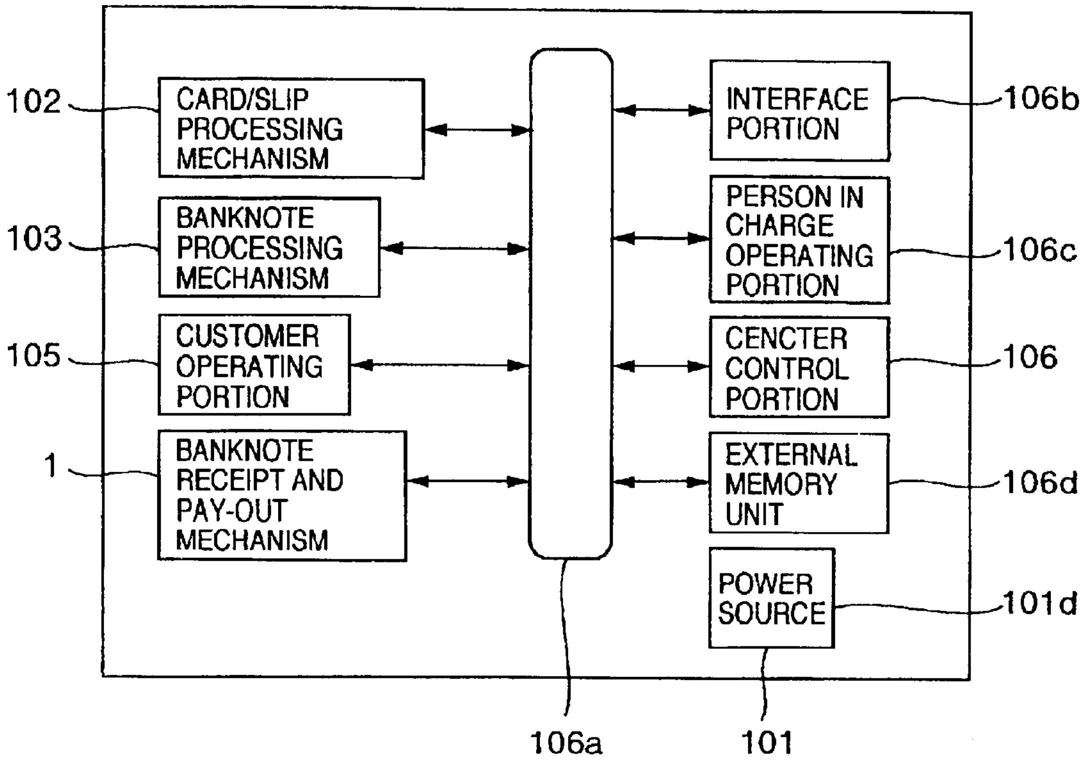
FIG. 13 is a bock diagram for explaining a control system in the automatic teller machine.

Referring to FIG. 13 which is a block diagram illustrating a control system for the automatic teller machine, as stated above, the card/slip processing mechanism 102, the bankbook processing mechanism 103, the banknote receipt and pay-out apparatus 1 and the user final control portion 105 which are accommodated in the body housing 101, are connected to the central control portion 106 through the intermediary of a bus 106*a*, and are operated as necessary under the control of the central control portion 106. The central control portion 106 is also connected thereto with an interface portion 106*d*, a staff final control portion 106*c* and an external memory unit 106*d* through the intermediary of the bus 106*a* in order to transfer required data thereamong, in addition to the components mentioned above, but detailed explanation will be omitted as they are not essential in the present invention. It is noted that reference numeral 101*d* denotes a power source for supplying an electric power to the above-mentioned several components.

Figure 14:
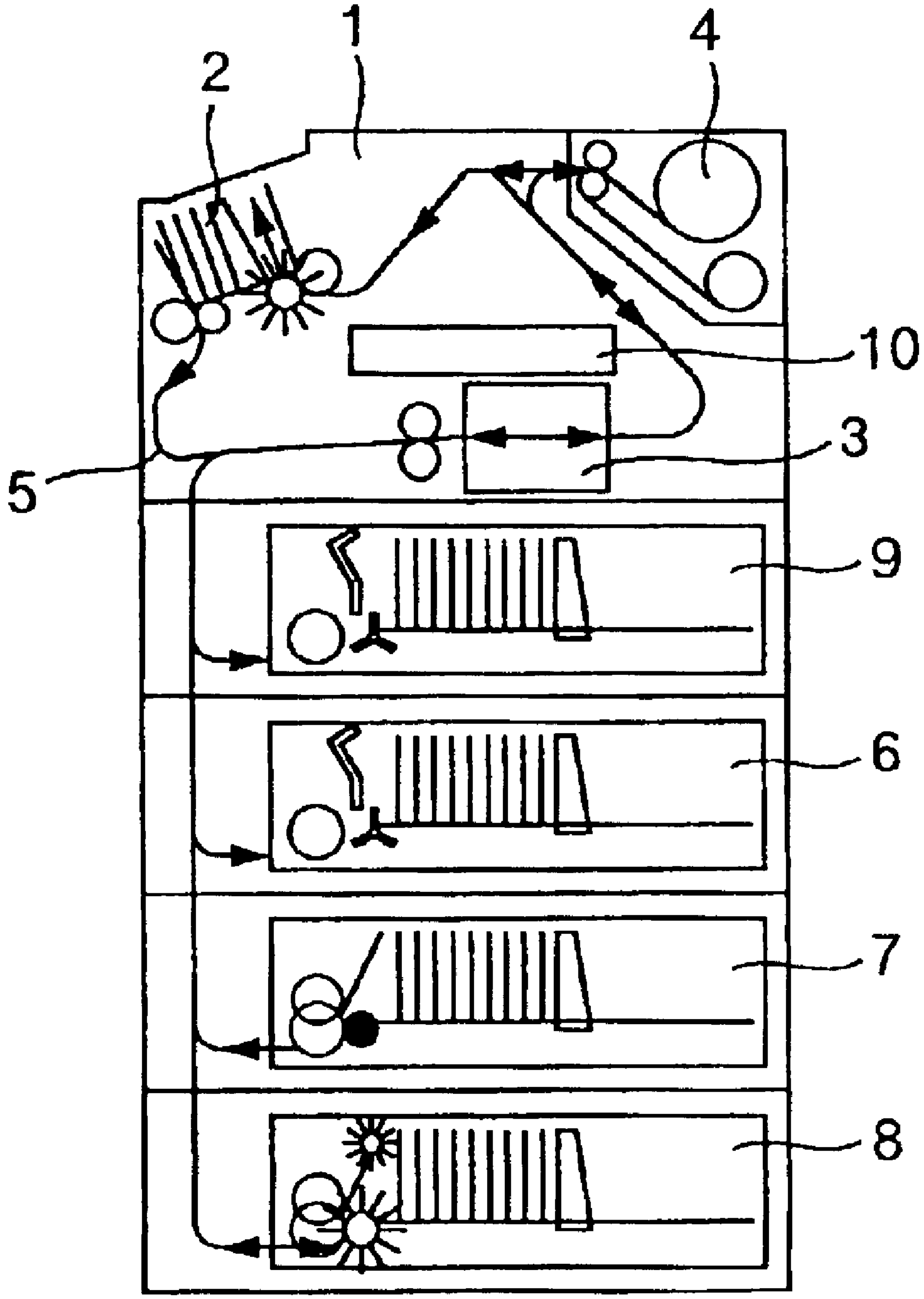
FIG. 14 is a side view for explaining a configuration of the banknote receipt and pay-out apparatus installed in the automatic teller machine.

FIG. 14 is a side view illustrating the configuration of the banknote receipt and pay-out apparatus 1 in the automatic teller machine shown in FIG. 12.

The banknote receipt and pay-out apparatus 1 is composed of a receipt and pay-out aperture 2 through which a user takes into and out banknotes, a banknote discriminating part 3 for discriminating a banknote, a temporary storage bin 4 for temporarily storing therein received banknotes until a transaction agreement is established, a single receipt bin 6 for storing banknotes for which the transaction agreement has been made, a single pay-out bin 7 for storing banknotes to be paid out, a single banknote receipt and pay-out box 8 for receiving and paying out banknotes, a reject bin 9 for storing received banknotes which cannot be stored in the receipt bin 6, or those of banknotes paid out from the pay-out bin 7, which are not externally paid out, (which is a bin for storing banknotes which cannot be discriminated by the discriminating portion 3), a banknote transfer path 5 for transferring banknotes to and from the receipt and pay-out aperture 2, the temporary storage bin 4, the receipt bin 6, the pay-out bin 7, the banknote receipt and pay-out box 8 and the reject bin 9 by way of the banknote discriminating portion 3, and a control portion 10. It is noted that the numbers of the above-mentioned respective components can be changed in accordance with a kind of use. The control portion 10 is adapted to control the banknote receipt and pay-out apparatus 1 in response to an instruction from the central control portion 106 or in accordance with a detected status of the banknote receipt and pay-out apparatus 1, and transmits as necessary an information of a status of the banknote receipt and pay-out apparatus 1 to the central control portion 106.

Figure 15:
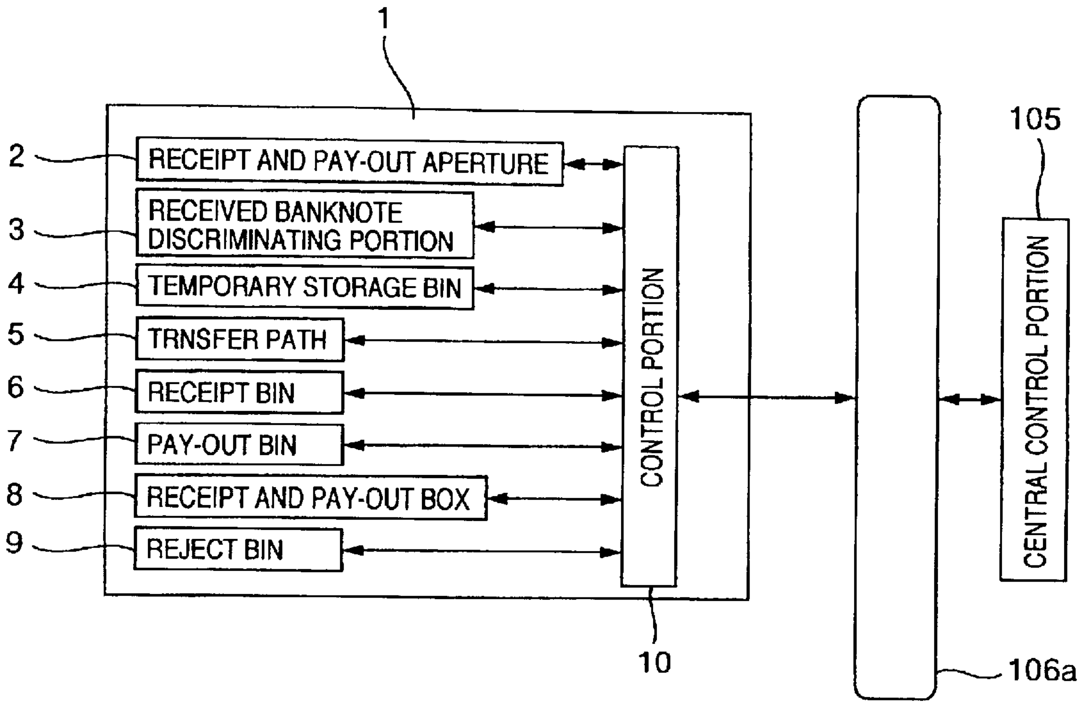
FIG. 15 is a bock diagram for explaining a control system in the banknote receipt and pay-out apparatus.

Referring to FIG. 15, the control portion 10 which is connected to the central control portion 10 in the automatic teller machine through the intermediary of the bus 106*a*, controls the banknote receipt and pay-out apparatus 1 in response to an instruction from the central control portion 101 and in accordance with a detected condition of the banknote receipt and pay-out apparatus 1, and delivers an information as to a condition of the banknote receipt and pay-out machine to the central control portion 106 as necessary. Further, within the banknote receipt and pay-out apparatus 1, the control portion 10 is connected to actuators including drive motors and solenoids, and sensors belonging to the units (the receipt and pay-out aperture 2, the banknote discriminating portion 3, the temporary storage bin 4, the banknote transfer path 5, the receipt bin 6, the pay-out bin 7, the banknote receipt and pay-out box 8, and the reject bin 9), and accordingly, controls and drives the actuators while monitors the conditions thereof by means of the sensors in accordance with a transaction.

Next, explanation will be made of operation of the banknote receipt and pay-out apparatus 1 with reference to FIGS. 12 to 15.

Upon receipt transaction, banknotes introduced in the receipt and pay-out aperture 2 are separated one by one from one another, and are checked by the banknote discriminating portion 3 for determining their denominations and whether they are counterfeit or not, and are then once stored in the temporary storage bin 4. Those of banknotes which cannot be discriminated by the banknote discriminating portion 3, or which are abnormally inclined or are fed at abnormal intervals, are once discharged from the banknote discriminating portion 3, and are diverted toward the receipt and pay-out aperture 2 from which they are returned to the user.

After the transaction of the receipt is completed, the banknotes are transferred from the temporary storage bin 4 and are again checked by the banknote discriminating portion 3 for determining their denominations and whether they are counterfeit or not, and are then stored in any one of the receipt bin 6, the banknote receipt and pay-out box 8 or the reject bin 9.

Upon pay-out transaction, banknotes are paid out in groups by predetermined numbers from the pay-out bin 7 and the banknote receipt and pay-out box 8, respectively, and are then checked by the banknote discriminating portion 3. Further, they are fed into the receipt and pay-out aperture 2 from which they are paid out to the user. Upon occurrence of pay-out reject, the associated banknotes are stored in the reject bin 9, and additional banknotes are paid out to make up for the deficit.

Explanation will be hereinbelow made of the configuration of the banknote receipt and pay-out box 8 according to the present invention, which is installed on the banknote receipt and pay-out apparatus 1 with reference to FIGS. 1 to 3. Although the banknote receipt and pay-out apparatus 1 may be installed therein with a plural number of banknote receipt and pay-out boxes, explanation will be made of an embodiment in which a single banknote receipt and pay-out box 8 is installed in the banknote receipt and pay-out apparatus 1.

Figure 1:
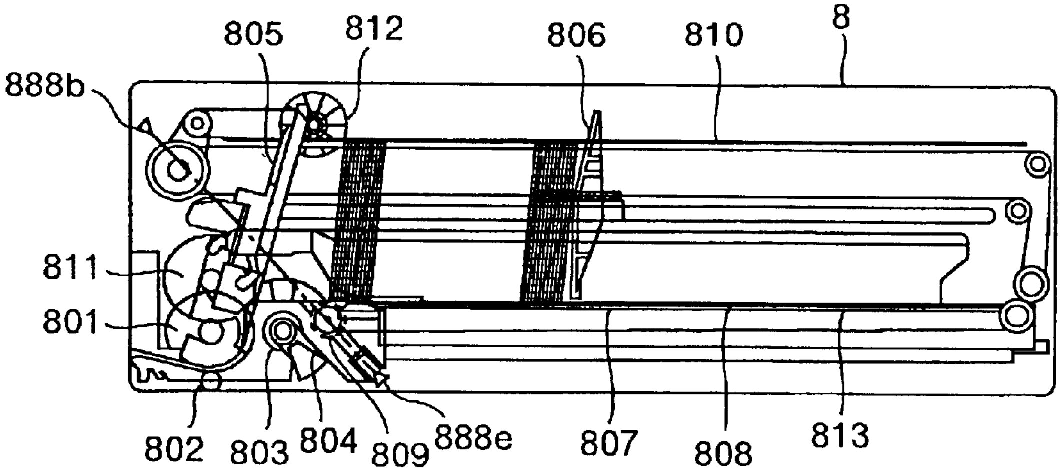
FIG. 1 is a side view illustrating a banknote receipt and pay-out box, according to the present invention, for a single size (a single denomination) in a banknote receiving condition.
Figure 2:
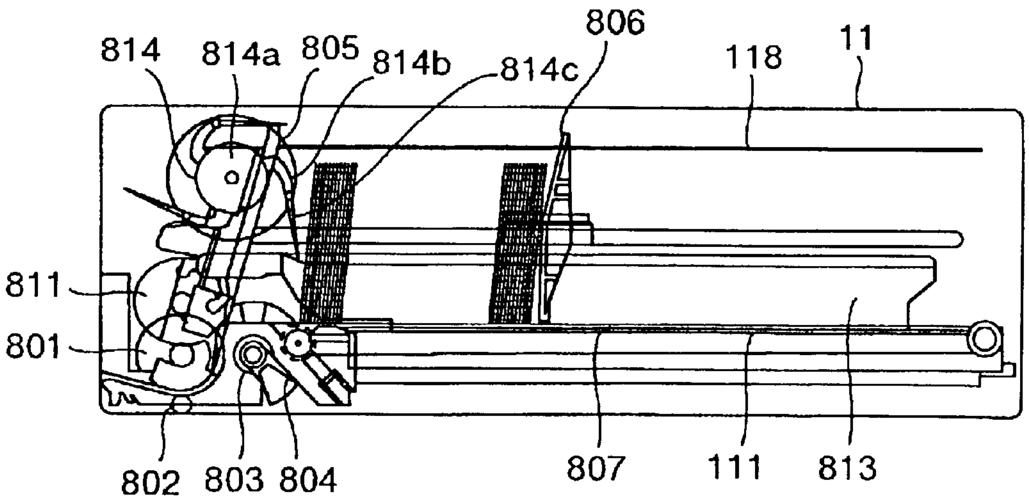
FIG. 2 is a side view illustrating a banknote receipt and pay-out box, according to the present invention, for various sizes (various denominations) in a banknote receiving condition.
Figure 3:
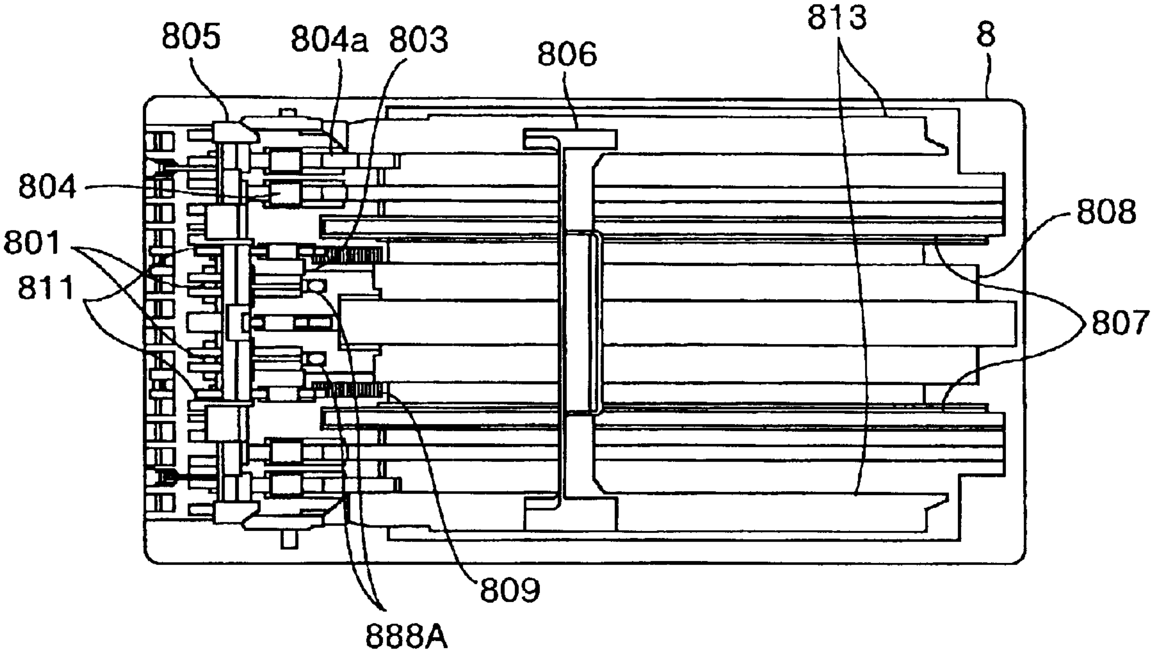
FIG. 3 is a top view illustrating the banknote receipt and pay-out box.

FIG. 1 shows a banknote receipt and pay-out box 8 for storing therein banknotes having a single size (single denomination) while FIGS. 2 and 3 show a banknote receipt and pay-out box 8 for storing therein banknotes having various sizes (various denominations).

It is noted that FIG. 3 which is a bottom view is common to both banknote receipt and pay-out boxes shown in FIGS. 1 and 2.

Referring to FIGS. 1 and 3, the banknote receipt and pay-out box 8 can stores therein banknotes in a standing posture, and can separate them from one another so as to pay out also in a standing posture.

The banknote receipt and pay-out box is provided in its take-in/out slot with stack feed rollers 801, pick-up rollers 811, driven back-up rollers 802, gate rollers 803 which can be rotated in a storing direction but cannot be rotated in a pay-out direction, inner and outer brush rollers 804, 804*a* coaxial with the gate roller 803 and having flexible push-in blades which are radially arranged, separation and stack guides 805 which change their positions between the position of separation and the position of stacking, and transmission sensors (residual banknote checking sensors) 888*a*, 888*b*.

It is noted that each of the brush rollers 804 has the radial blades which are arranged over only about a half of the circumference thereof in order to carry out banknote pay-out operation which will be explained later. Further, the brush roller 811 is rotated in synchronization with the rotation of the stack feed roller 801, and further, is rotated in a direction reverse to the rotating direction of the latter so as to aim at commonly using a drive source. The brush roller 804 is coupled to the stack feed roller 801 through the intermediary of a one-way clutch which allows free rotation in one direction but inhibits rotation in the other direction. That is, it is rotated clockwise but is not rotated counterclockwise as viewed in FIG. 1. Thus, the brush roller 804 is not rotated during pay-out of banknotes.

Further, a space where banknotes are stored is defined by a bottom panel 808, bottom surface belts 807 which are laid at a level higher than that of the bottom panel 808 and which are stretched so as to support the lower edges of banknotes, a pusher plate 806, the separation stack guides 805, a stopper 810 (top panel) and side walls 813. It is noted that the stopper is adapted to limit the upper edges of banknotes, and can be adjusted up and down, integral with upper banknote support members 812.

Further, the positions where the side walls 812 are attached, can be set in accordance with a size of banknotes. The inter-side wall space width of the side walls 813 are set preferably to a value which is larger than the widthwise size of the banknotes by about 2 to 10 mm. With this setting, banknotes even having a smaller size can be stably stored in the banknote receipt and pay-out box 8, and accordingly, the inter-side wall space width of the banknote receipt and pay-out box 8 is larger than the widthwise size of the banknotes but smaller than the width of the receipt and pay-out aperture 2.

Further, the upper banknote support members 811 are arranged so as to be tangled with the separation stack guides 805, and lower banknote support members 809 are located right below the upper banknote support member 812. Further, the upper banknote support members 812 and the lower banknote support members 809 are adapted to be rotated by a drive source which is not shown, in association with the pusher plate 806 and the bottom surface belts 807 in the stacking direction of banknotes. However, the upper banknote support members 812 are coupled to the pusher plate 806 and the bottom surface belts 807 through the intermediary of one-way clutches, and accordingly, the upper banknote support members 812 can be rotated freely during pay-out of banknotes.

Referring to FIGS. 2 and 3, the banknote receipt and pay-out box 8 is provided at its banknote take-in/out slot with stack feed rollers 801, pick-up rollers 811, driven back-up rollers 802, gate rollers 803 which are rotated in the storing direction but are not rotated in the pay-out direction, brush rollers 804 which are coaxial with the gate rollers 803 and having flexible push-in members radially extended, and separation and stack guide rollers 805 which are displaced between a separating position and a stacking position.

It is noted that each of the brush rollers 804 has the radial blades which are arranged over only about a half of circumference thereof in order to carry out banknotes pay-out operation. Further, the pick-up rollers 811 are rotated in synchronization with the stack feed rollers 801, and further, the brush rollers 804 are rotated in a direction reverse to that of the stack-feed rollers 801 in order to aim at commonly using their drive source.

Further, the brush rollers 804 are coupled to the stack feed rollers 801 through the intermediary of one-way clutches, and accordingly, are not rotated during pay-out of banknotes.

It is noted that a one-way clutch can rotate freely in one direction but cannot rotate in the other direction, that is, it rotates clockwise but does not counterclockwise as viewed in FIG. 2.

The banknote receipt and pay-out box 8 has a space for storing therein banknotes, which are defined by a stationary bottom 111, bottom belts 807 which are stretched at a level higher than that of the stationary bottom 111 so as to support the lower edges of the banknotes, a pusher plate 806, the separation stack guides 805, a movable top panel 118 and side walls 813.

Stack assist members 814 for guiding the leading end part of a banknote to be stored, in an advancing direction of the banknote, are provided above the separation and stack guides 805. Each of the separation and stack guides 805 is composed of a roller part 814*a*, L-like blade parts 814*b*, and movable tip parts 814*c* connected to the distal ends of the blade parts 814*b* so as to be rotatable over a predetermined angle, and is rotated under control by a stack assist member rotation control portion which is not shown. The stack assist member 814 is mounted so that the outer peripheral surface of their roller part 814*a* is positioned on upward extension from the banknote guide surfaces of the separation stack guide 805.

Explanation will be hereinbelow made of the L-like blade parts 814*b* and the movable tip parts 814*c*.

Each of the L-like blade parts 814*b* projected from the roller part 814*a* has such a shape that its distal end part on the banknote storage space side, is bent in an L-like shape toward the banknote take-in/our slot. A part of the blade part 814*b* extending from the bent part to the distal end thereof defines, at its inner surface opposed to the outer peripheral surface of the roller part 814*b*, a receiving space in cooperation with the outer peripheral surface of the roller part 814*a*, and accordingly, the leading end of a received banknote is guided into this receiving space. The inner surface of the blade part, extending from the roller part 814*a* to the bent part of the blade part 814*b* defines a stopper portion defining the inward end surface of the receiving space so as to restrain excessive advance of the upper edge of a stored banknote.

The blade part 814*b* is connected thereto at its distal end with the movable tip which is therefore to be rotatable over a predetermined angle, the movable tip part 814*c* defining a stack space between itself and the separation stack guide 805 for guiding the upper edge of a stored banknote into the receiving space.

Figure 4:
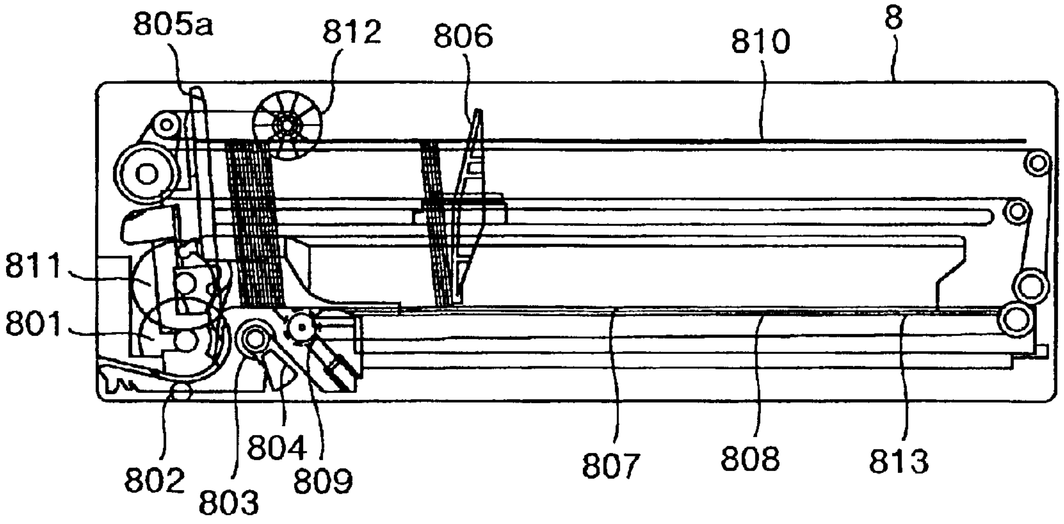
FIG. 4 is a side view illustrating the banknote receipt and pay-out box in a banknote paying out condition.

Next, referring to FIG. 4, explanation will be made of the banknote storing operation of the banknote receipt and pay-out box 8 shown in FIG. 1. A banknote to be stored into the banknote receipt and pay-out box 8 is led into nips between the stack feed rollers 801 rotated by a drive motor which is not shown, and the back-up rollers 802 and then into nips between the stack feed rollers 801 and the gate rollers 803 rotated in the stacking direction, and accordingly, the banknote is taken into the banknote receipt and pay-out box 8 along the separation stack guides 805. When the banknote is taken into, the brush rollers 804 scoop out the lower edge of the banknote in the stacking direction in order to prevent the banknote from interfering with a next banknote to be taken into.

Although a beam between the transmission sensors 888*a*, 888*b* is blocked by the banknote taken into, the blocking of the beam can be limited to a short time in the case of a less number of banknotes to be taken into since the lower edge of a banknote is scooped out by the brush rollers 804.

However, banknotes are successively taken into, the number of banknotes in a stack is increased gradually, and accordingly, the brush rollers cannot scoop out the banknotes. Thus, the time of blocking the beam between the sensors 888*a*, 888*b* becomes longer.

If the time of blocking the beam between the sensors 888*a*, 888*b* becomes longer than a predetermined time, the pusher plate 806 and the bottom belts 807 are moved as one unit body by a drive source which is not shown and is located outside of the box so as to carry the banknotes away from the separation stack guides 805. With this operation, a banknote taken into can be prevented from interfering with the banknotes which have been stored. Further, at this time, the upper banknote support members 812 are rotated counterclockwise as viewed in FIG. 1. Since the upper banknote support members 812 are incorporated so as to be tangled with the upper parts of the separation stack guides 805, the upper edge of the banknote which is taken into along the separation stack guides 805 is then supported by the upper banknote support members 812 on rotation.

The lower banknote support members 809 located substantially right below the upper banknote support members 812 are rotated clockwise as shown in FIG. 1. Thus, the lower edge of the banknote is supported by the lower banknote support members 809. Thus, the banknote having been stored is supported at both upper and lower ends, and accordingly, is maintained in its standing posture.

Figure 5:
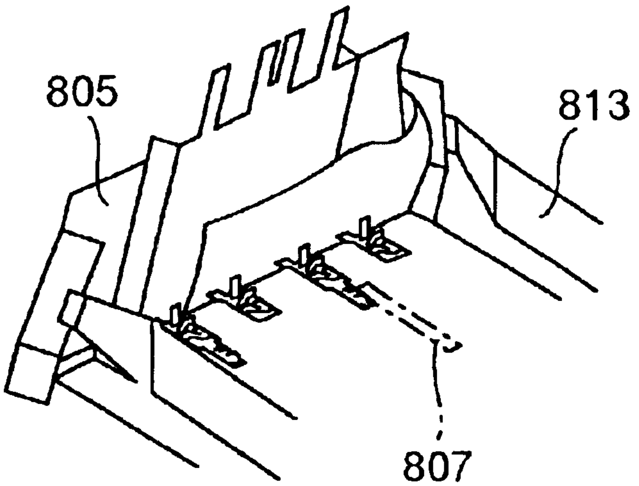
FIG. 5 is an enlarged view illustrating a banknote take-in/out slot of the banknote receipt and pay-out box.

Next, explanation will be made of such a case that a banknote deviated widthwise by a large degree is taken into the banknote receipt and pay-out box 8. A banknote which has been deviated widthwise is once deformed in its widthwise end part along a side end guide surface of the separation stack guide 805 as shown in FIG. 5. The side end guide surface of the separation stack guide 805 has such a configuration that its width is decreased in the banknote advancing direction during storing thereof. Thereafter, the deformed banknote corrects its deviation with the use of its restoring force which is produced when it is released from the nipping between the stack feed rollers 801 and the gate rollers 803.

Further, as shown in FIG. 5, the width of the interspace between the front end part of the side walls 813 on the banknote take-in/out slot side is equal to that of the separation stack guides 805, but becomes narrower in a direction away from the take-in/out slot.

Figure 18:
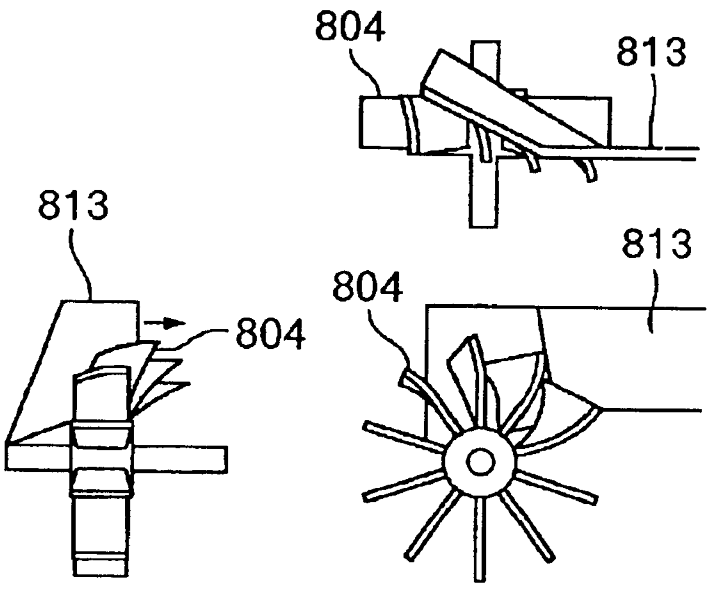
FIG. 18 is a view illustrating a brush roller and an oblique surface of a side wall in the banknote receipt and pay-out box, which make contact with each other.

As shown in FIG. 18, since the flexible blades of the brush roller 804*a* make contact with an oblique surface part of the side wall 813, the flexible blades of the brush roller are deformed in a direction indicated by the arrow shown in FIG. 18 while they are rotated. If a banknote taken into the banknote receipt and pay-out box 8 is deviated, a part of the banknote which has been deviated from the storage space is caught between the oblique surface part of the side wall 813 and the flexible blades of the brush roller 804*a* while the banknote is advanced in the storing direction. At this stage, the deviation of the banknote is further corrected along the oblique surface part due to a friction force between the flexible blades of the brush roller 804*a* and the banknote.

This outer brush roller 804*a* does not interfere with a banknote which is to be paid out since the banknotes stored in the banknote receipt and pay-out box 8 have been already arranged in order.

Thus, the banknote which has been deviated widthwise by a large degree is shifted and corrected by way of two stages in the banknote receipt and pay-out box 8, and accordingly, a degree of correction for deviation can be increased.

Next, explanation will be made of operation of a banknote receipt and pay-out box 11 shown in FIG. 2 with reference to FIG. 4.

A banknote to be stored in the receipt and pay-out box 11 is led into nip gaps between the stack feed rollers 801 rotated by a drive motor which is not shown, and the back-up rollers 802, and is then led into nip gaps between the stack feed rollers 801 and the gate rollers 803 rotated in the stacking direction. Then it is finally taken into the receipt and pay-out box 11 along the separation stack guides 805. When the banknote is taken into, the brush rollers scoop out the lower edge of the banknote in the stacking direction in order to be prevented from interfering with a next banknote which is then taken into.

Explanation will be hereinbelow made of storing operation of the receipt and pay-out box 11 in the case of storing banknotes having different sizes.

First, in the case of storing a banknote having a small size, when a sensor which is not shown detects a banknotes having a small size, which is transferred toward the receipt and pay-out box 11, the stack assist member rotation control portion controls the stack assist members 814 which therefore take angular positions corresponding to the banknote having a small size. That is, the stack assist members 814 are controlled so that the distance between the banknote upper end stopper portion and the banknote take-in/out slot becomes equal to a value obtained by adding a predetermined length to the length of the banknote.

The banknote taken into and nipped by the stack feed rollers 801 and the gate rollers 803 jumps into a stack space just after it is released from the nipping therebewteen, and the upper end thereof is regulated by the upper end stopper portion. As mentioned above, since the stack assist members 814 are controlled so that they take positions corresponding to the banknote having a small size, the upper end of the banknote jumped into the stack space is led into the receiving space, and is then stored in the stack space still in a standing posture while the upper end thereof is regulated by the upper end stopper portion.

Second, in the case of storing a banknote having a large size, when the sensor which is not shown detects a banknote having large size, which is transferred toward the receipt and pay-out box 11, the stack assist member rotation control portion controls the stack assist members 814 which therefor take angular positions corresponding to the banknote having a large size. That is, the stack assist members 814 are controlled so that the distance between the banknote upper end stopper portion and the banknote take-in/out slot becomes equal to a value which is obtained by adding a predetermined length to the length of the banknote having a large size.

The banknote to be stored, nipped between the stack feed rollers 801 and the gate rollers 803, jumps into the stack space after it is released from the nipping therebetween, and the upper end thereof is regulated by the upper end stopper portion. As mentioned above, since the stack assist members 814 are controlled so as to take angular positions corresponding to the banknote having a large size, the upper end of the banknote having jumped into the stack space is led into the receiving space, and is regulated by the upper end stopper portion so as to be stacked in the stack space still in a standing posture.

Banknotes stored in the stack space are stacked therein which they are held in a standing posture.

Thus, according to the present invention, banknotes having various sizes can be stored in one and the same receipt and pay-out box 11, being mingled with one another therein.

Next, the banknote separating operation of the receipt and pay-out operation will be hereinbelow explained with reference to FIGS. 2 and 3. When the banknote is paid out, as shown in FIG. 3, the separation stack guide 805 is displaced with the use of a drive source which is not shown, up to positions where the pick-up rollers 811 are exposed from the separation stack guides 805, and further, the stack assist members 814 are displaced up to positions where the blade parts 814*b* are not exposed from the separation stack guides 805. Further, by moving the pusher plate 806 and the bottom belts 807 with the use of a drive source which is not shown, stored banknotes are displaced until a predetermined pressing force is exerted to the pick-up rollers 811. Next, by rotating the pick-up rollers 811 and the stack feed-rollers 801 with the used of a drive source which is not shown, the banknotes pressed against the pick-up rollers 811 are fed out one by one, being separated from one another. Further, the gate rollers 803 which are not rotated in the pay-out direction by means of the incorporated one-way clutch can prevent banknotes from being caught to one other during pay-out.

Next, explanation will be made of pay-out operation of the banknote receipt and pay-out box 8 shown in FIG. 1 with reference to FIG. 3. As mentioned above, each of the brush rollers 804 has the flexible radial blades which are arranged over about one half of circumference thereof. When a banknote is paid out, the brush rollers 804 are stopped and held with such a phase that the sheet does not protrudes so as to prevent hindrance to separation of banknotes. It is noted that the brush rollers 804 are not rotated during pay-out of a banknote since the brush rollers 804 are coupled with the stack feed rollers 801 by way of the one-way clutches.

Then, the separation stack guides 805 are displaced to positions indicated by 805*a*, and the pusher plate 806 and the bottom belts 807 are moved as a unit body by a drive source which is not shown and which is outside of the box in order to move the banknotes until a predetermined pressing force is exerted to the pick-up rollers 811. Then, the banknotes pressed against the pick-up rollers 811 are separated one by one through the rotation of the pick-up rollers 811 with the use of a drive source which is not shown. At this stage, the banknotes are paid out from the banknote receipt and pay-out box 8 while banknotes are prevented from being caught with one another during feeding, by means of the gate rollers 803 which are not rotated in the pay-out direction due to the action of the incorporated one-way clutches. During separation and feed-out of the banknotes, the pusher plate 806 and the bottom belts 807 are kept on moving so as to apply a predetermined pressing force to the pick-up rollers 811 under control.

Detailed explanation will be hereinbelow made of preferred embodiments of the present invention.

First, in the case of dealing with banknotes having sizes which are different from one another by a large degree, in the banknote receipt and pay-out apparatus 1, the width of the transfer path in the banknote receipt and pay-out apparatus has to be set to value which is larger than the width of banknotes having a largest size among the banknotes to be dealt with.

Meanwhile, if the storing width of the banknote receipt and pay-out box 8 is set to be narrow, corresponding to the width of banknotes having a small size, the banknotes having a narrow width has to be received from the transfer path having a wide width into the banknote receipt and pay-out box having a narrow storing width. However, a maximum value of a degree of deviation (shift value) in a direction orthogonal to the transfer direction becomes large due to a large difference between the width of the banknotes having a small size and the width of the transfer path. Thus, it is difficult to store the banknotes into the banknote receipt and pay-out box 8 having a narrow storing width from the transfer path having a wide width.

Thus, the storing width of the banknote receipt and pay-out box 8 has to be set to a value substantially equal to the width of the transfer path (or narrower than that by about 10 mm). Thus, the difference between the storing width of the banknote receipt and pay-out box 8 and the width of banknotes having a small size becomes larger.

Incidentally, the pay-out bin 7 which only carries out pay-out may be set to a size of banknotes to be paid out.

Figure 19:
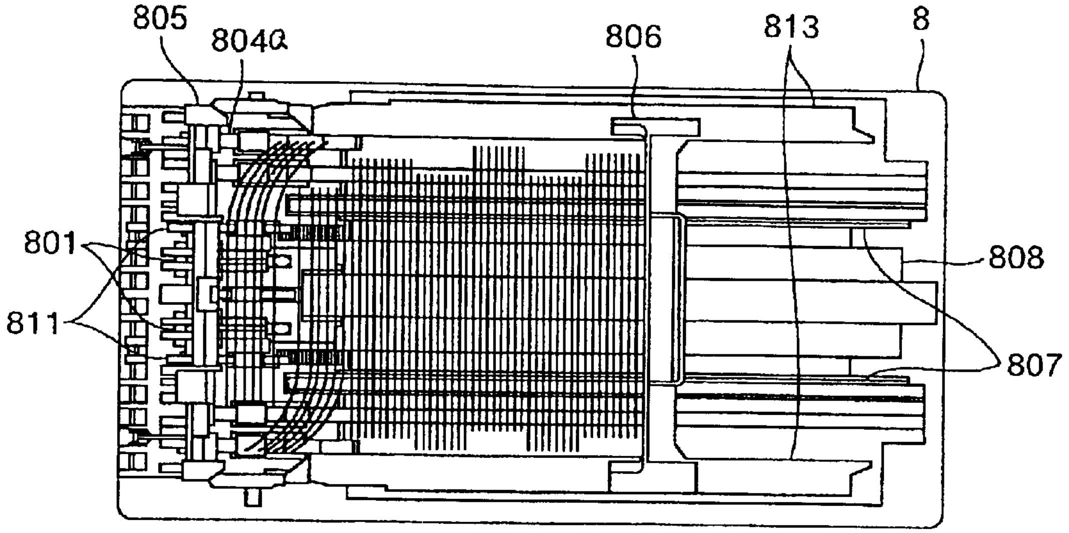
FIG. 19 is a top view illustrating the banknote receipt and pay-out box in such a state that banknotes received in disorder between the side walls of the banknote receipt and pay-out box.

By the way, in order to use or operate the automatic teller machine, the pay-out bin 7 and the banknote receipt and pay-out box 8 in which banknotes have been stored must be transported to the automatic teller machine for preparation by a person in charge with the use of a vehicle or the like from his bank, and then must be installed in the automatic teller machine. If the difference between the storing width of the banknote receipt and pay-out box and the width of banknotes stored therein is large, some of banknotes stored in the banknote receipt and pay-out box intrude into gaps between the banknotes and the side walls of the banknote receipt and pay-out box 8 as shown in FIG. 19 during the transportation, resulting in that the banknotes cannot be normally paid out.

It is noted that the storing width is that of a space in which the banknotes introduced from the banknote transfer path 5 into the banknote receipt and pay-out box are stored, that is, the longitudinal width of the banknotes stacked in a standing posture in this embodiment. That is, it corresponds to the inter-side wall space width of the banknote receipt and pay-out box 8.

The explanation will be hereinbelow made of a configuration of a first embodiment of the present invention. In this first embodiment, there is provided a storing width adjusting means which solves the above-mentioned problem.

Referring to FIGS. 6 to 11, the storing width adjusting means will be explained.

The storing width adjusting means in this embodiment incorporates an installation detecting portion and an inter-side wall space width adjusting means. The installation detecting portion is composed of a contact part 818 provided in a mounting portion 18 and a contact member 815 provided in the banknote receipt and pay-out box 8.

When the banknote receipt and pay-out box 8 is installed in the mounting portion 18, the contact part 816 and the contact member 815 are made into contact with each other so as to be engaged together, and accordingly, the installation thereof can be detected. When the installation thereof is detected, the inter-side wall space width of the storing space in the banknote receipt and pay-out box 8 is changed by the inter-side wall space width changing means. In this embodiment, the contact member 815 provided in the banknote receipt and pay-out box is movable and is coupled to the movable side wall 818. Accordingly, when the contact member 815 is engaged with the contact part 816, the movable wall 818 is displaced.

The configuration of the contact member 815 and the movable wall 818 will be hereinbelow explained.

FIGS. 6 to 9 shows the configuration of the contact member 815 and the movable wall 818.

Figure 6:
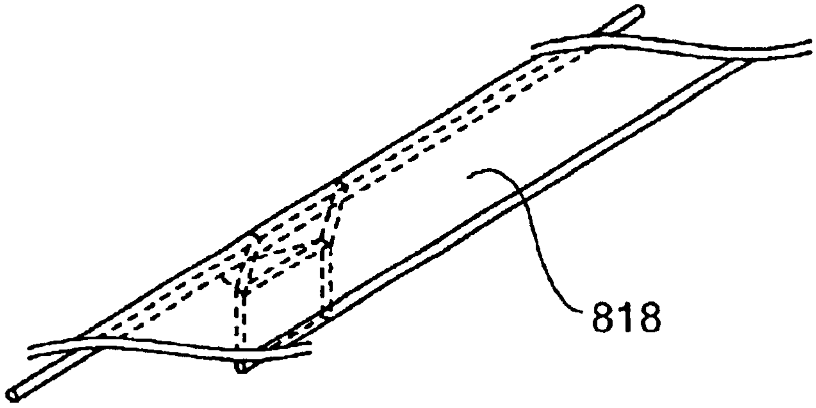
FIG. 6 is an enlarged view illustrating a movable wall in the banknote receipt and pay-out box in a condition in which the storage space of the banknote receipt and pay-out box is narrow.
Figure 8:
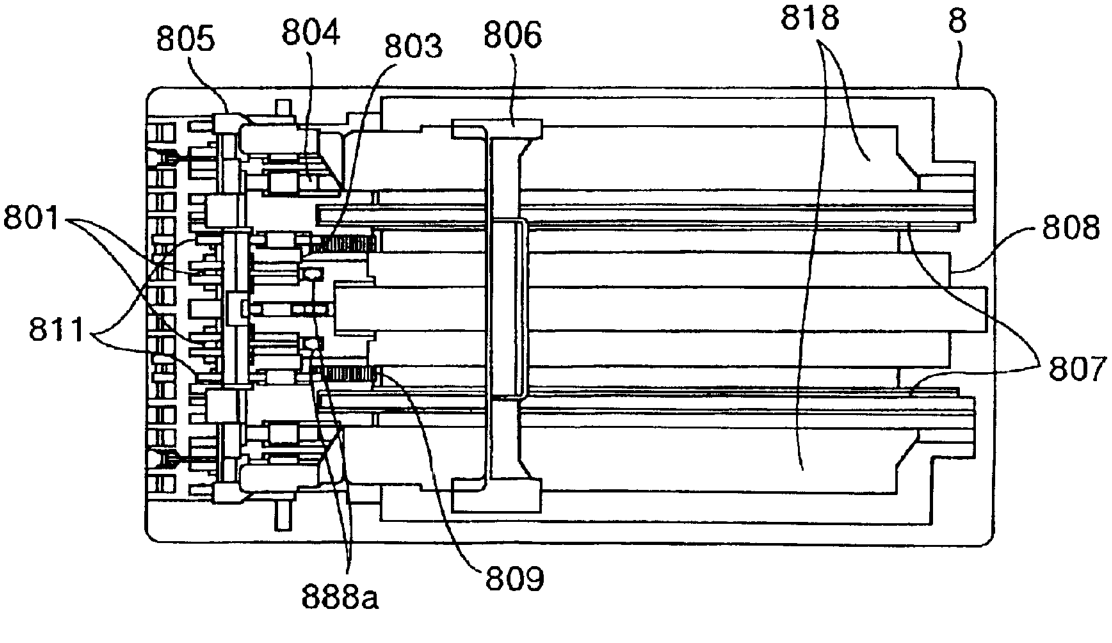
FIG. 8 is a top view illustrating the banknote receipt and pay-out box in which the storage space thereof is narrow.

Both FIGS. 6 and 8 show such a condition that the inter-side wall space width is narrow in order to prevent the arrangement of banknotes from being disordered when the banknote receipt and pay-out box 8 is transported by a person in charge.

Figure 7:
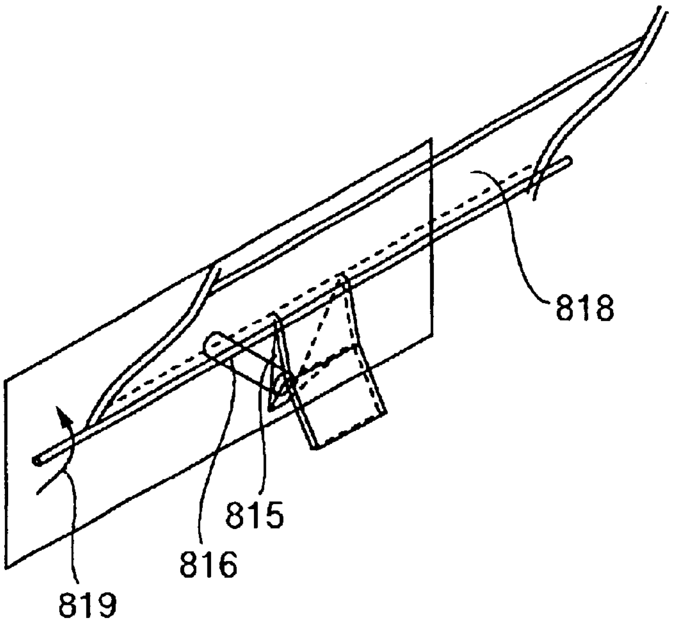
FIG. 7 is an enlarged view illustrating a movable wall in the banknote receipt and pay-out box in a condition in which the storage space of the banknote receipt and pay-out box is wide.
Figure 9:
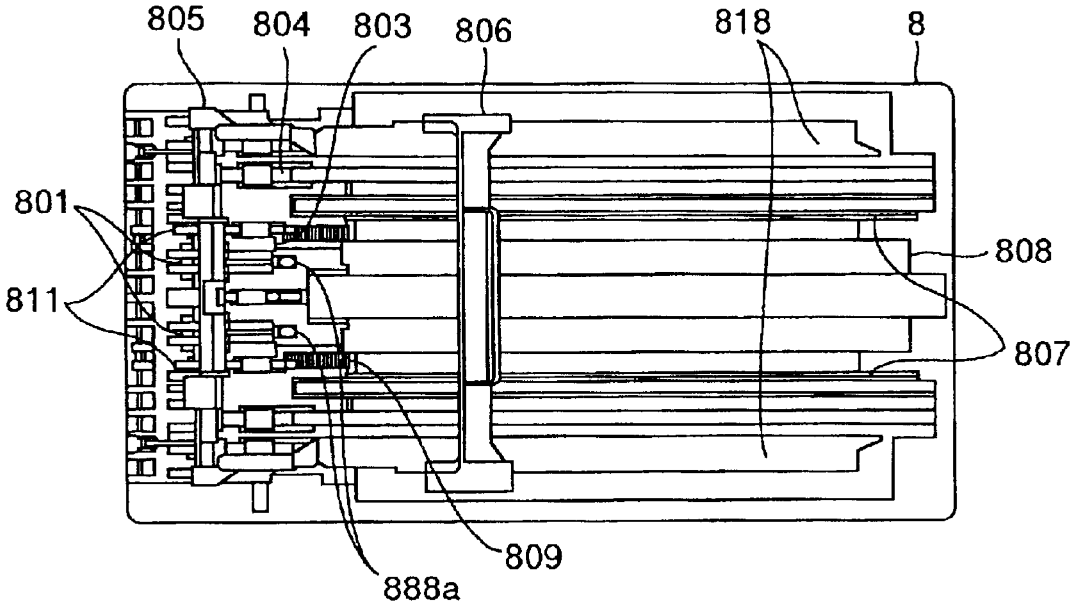
FIG. 9 is a top view illustrating the banknote receipt and pay-out box in which the storage space thereof is wide.

Further, both FIGS. 7 and 9 show such a condition that the banknote receipt and pay-out apparatus is on operation after the banknote receipt and pay-out box 8 is installed thereon. At this stage, the inter-side wall space width becomes wider, corresponding to the width of the transfer path, and accordingly, a banknote having a small size, and transferred on the transfer path can be received in the banknote receipt and pay-out box 8.

The movable wall 818 takes a position as shown in FIG. 6 during transportation since it is urged by a spring which is not shown.

Figure 10:
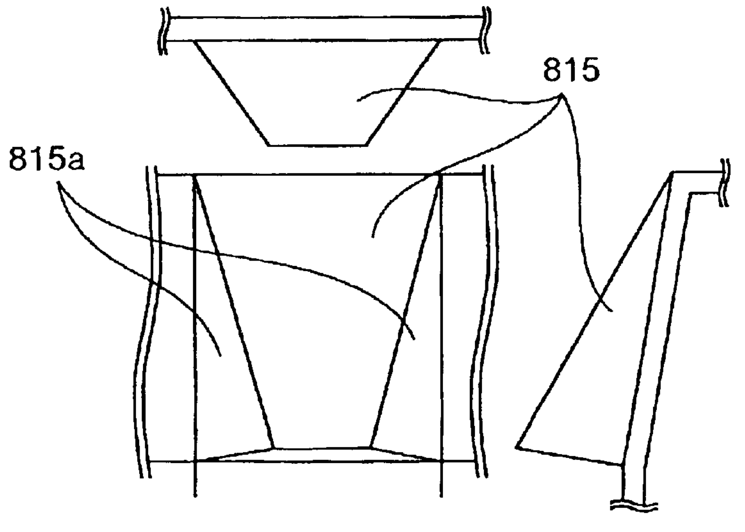
FIG. 10 is an enlarged view illustrating a contact member in the banknote receipt and pay-out box.

The contact member 815 is coupled to the movable wall 818, and as shown in FIG. 10, it has oblique surfaces 815*a* which are formed at each side surface of the banknote receipt and pay-out box 8 in a substantially center part thereof as viewed in the mounting direction, and which is adapted to be pressed as the contact part 816 makes laterally contact therewith. Further, the contact member 815 has both oblique surfaces on both sides thereof, the movable wall 818 carries out an identical motion even though the contact member 815 is pressed in any of the two directions.

Figure 11:
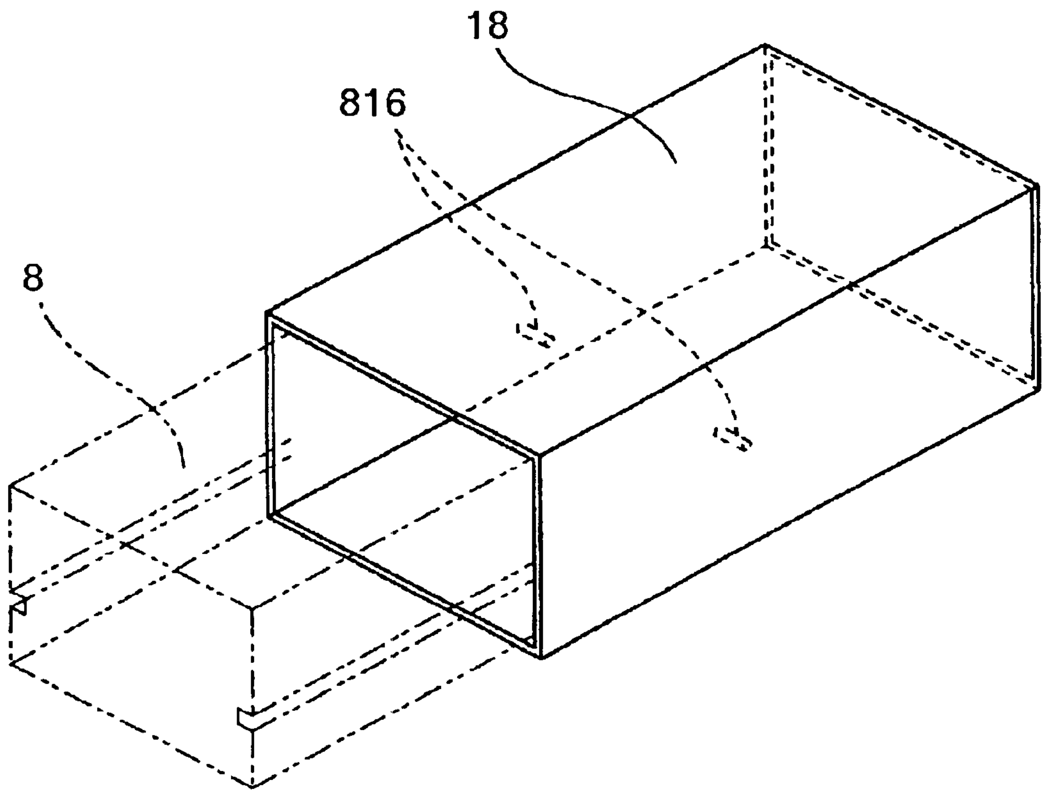
FIG. 11 is a view illustrating the banknote receipt and pay-out box in a condition it is installed on the banknote receipt and pay-out apparatus.

Meanwhile, as shown in FIG. 11, since the contact part 816 is provided on the banknote receipt and pay-out apparatus 1 in a part where the banknote receipt and pay-out box 8 is mounted. Further, the banknote receipt and pay-out box 8 is formed there in grooves in the storing direction through which only the contact part 815 makes contact with the contact member 816. The contact part 816 is formed at each side surface of the mounting portion 18 at a substantially center thereof in the storing direction, as is similar to the oblique surfaces of the contact member 815*a*, and accordingly, the contact part 816 makes contacts with the contact member 816 so as to push out the latter when the banknote receipt and pay-out box 8 is installed on the mounting portion 18.

Next, explanation will be made of operation and technical effects of this embodiment during running of the automatic teller machine.

The banknote receipt and pay-out box 8 falls in a condition shown in FIG. 6 or 8 until it is mounted on the banknote receipt and pay-out apparatus 1 after transportation of the banknote receipt and pay-out box 8 in which banknotes are set by a person in charge. In this case, the banknote storing width of the banknote receipt and pay-out box 8 is substantially equal to the size of the banknotes, and accordingly, there are less gaps therebetween. Thus, no disorder is caused in the arrangement of the banknotes.

When the banknote receipt and pay-out box 8 is installed on the banknote receipt and pay-out apparatus 1, the contact part 816 incorporated in the banknote receipt and pay-out apparatus 1 make contact with the contact member 815, as shown in FIG. 7, and accordingly, the movable side wall 818 are turned in a direction indicated by the arrow 819. Thus, the distance between the end parts, on the side supporting the banknotes in a standing posture, of the movable walls 818 which are provided on both sides of the banknote receipt and pay-out box 8 becomes longer, and accordingly, the storing width of the banknote receipt and pay-out box 8 becomes wider. Thus, banknotes even having a small size, which are transferred on the transfer path corresponding to banknotes having a maximum width, can be stably taken into the banknote receipt and pay-out box 8. It is noted that the contact part 816 and the oblique surfaces 815*a* are provided on each of the side walls of the mounting portion 18 and each of the side walls of the banknote receipt and pay-out box 8, respectively, at a substantially center thereof in the storing direction, as stated above, the banknote receipt and pay-out box 8 can be installed on the banknote receipt and pay-out apparatus 1 from either the front or rear side of the latter.

Further, each movable side wall 818 is urged by, for example, springs having both opposite ends attached to the movable side wall 818 and the associated side surface of the banknote receipt and pay-out box 8, in a direction in which the movable side wall is returned to the position shown in FIG. 6, but if the movable side wall 818 makes contact with banknotes stored in the banknote receipt and pay-out box 8, the turning of the movable side wall 818 is stopped at a position where it is supported by the banknotes. Thus, the banknotes remaining in the banknote receipt and pay-out box 8 can be prevented from being damaged when the banknote receipt and pay-out box 8 is removed from the banknote receipt and pay-out apparatus 1.

Figure 16:
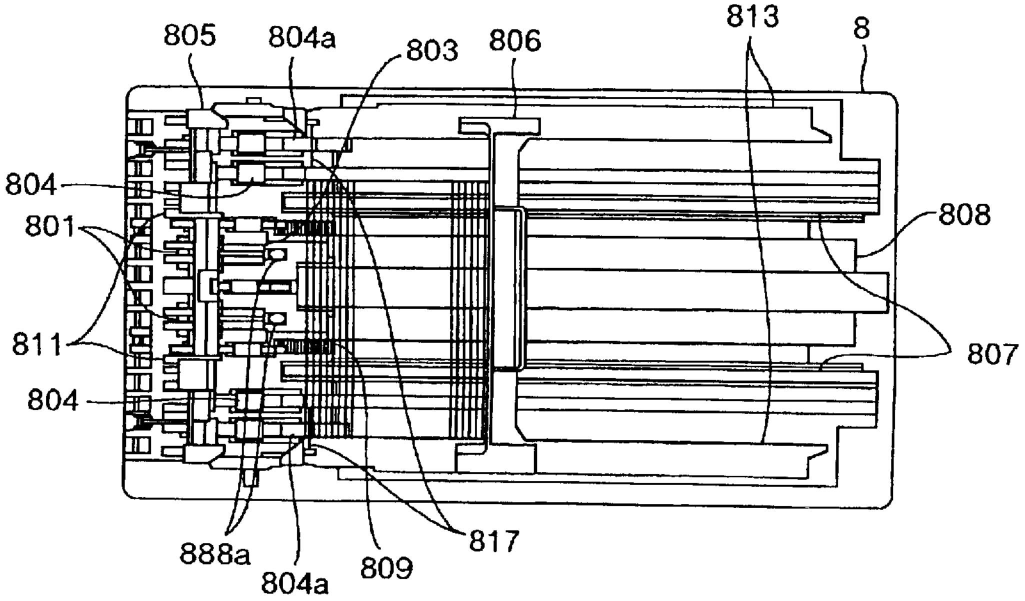
FIG. 16 is a top view illustrating the banknote receipt and pay-out box.
Figure 17:
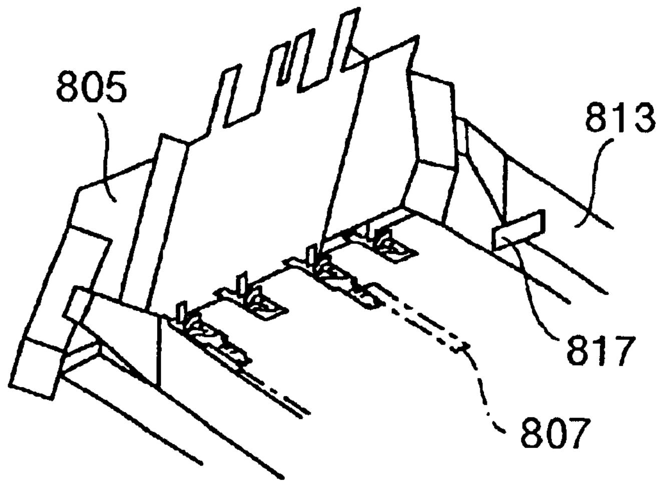
FIG. 17 is an enlarged view illustrating a part of the banknote receipt and pay-out box in which a guide sheet is provided.

Further, if the difference between the inter-side wall space width of the banknote receipt and pay-out box 8 and the size of the banknotes is large, the banknotes tend to be stacked in disorder within the banknote receipt and pay-out box 8 when received banknotes are stored in the banknote receipt and pay-out box 8. That is, as show in FIG. 16, if banknotes stored in the banknote receipt and pay-out box 8 are off toward one side, the gap between one side wall of the banknote receipt and pay-out box 8 and the stored banknotes becomes wider, and accordingly, there would be caused such a risk that received banknotes intrude into the gap. In order to avoid causing this problem, as shown in FIG. 16 or 17, guide sheets 817 made of flexible materials, are provided in the banknote receipt and pay-out box 8. Since guide sheets 817 are flexible, they are forced down by the banknotes which have been stored or which are to be paid out. Thus, a banknote transferred to the banknote receipt and pay-out box 8 is prevented from intruding into the gap between one side wall of the banknote receipt and pay-out box 8 and the stored banknotes.

Next, detailed explanation will be made of a second embodiment of the present invention with reference to FIGS. 20 to 24. At first, the configuration of the second embodiment will be explained. It is noted that although explanation will be made in this embodiment with the use of a receipt and pay-out box 11 for banknotes having various sizes, this embodiment can also be practiced even with the use of a banknote receipt and pay-out box 8 for a single size.

Figure 20:
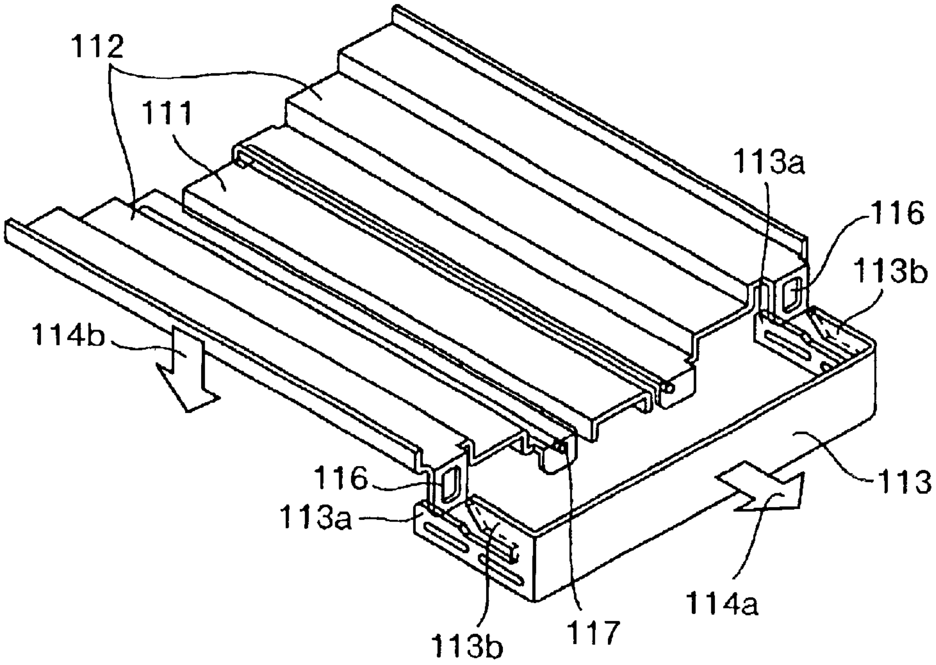
FIG. 20 is a perspective view illustrating a movable bottom of a banknote receipt and pay-out box which has not yet been installed on the banknote receipt and pay-out apparatus.

When the receipt and pay-out box 11 is removed from the banknote receipt and pay-out apparatus 1, that is, it is replenished with banknotes by a person in charge or when it is transported by a vehicle or the like, movable bottoms 112 are projected upward from a stationary bottom 111 as shown in FIG. 20. The movable bottoms 112 serve as an aligning mechanism for aligning and holding banknotes around the widthwise center of the receipt and pay-out box 11. Since the bottom of the receipt and pay-out box 11 are stepwise, even though the receipt and pay-out box 11 in which banknotes having different sizes are stored is transported by a vehicle or the like, the banknotes can be prevented from being widthwise slipped by a large degree. Accordingly, the banknotes can be stably separated from one another after the receipt and pay-out box 11 is installed on the banknote receipt and pay-out apparatus 1.

Figure 21:
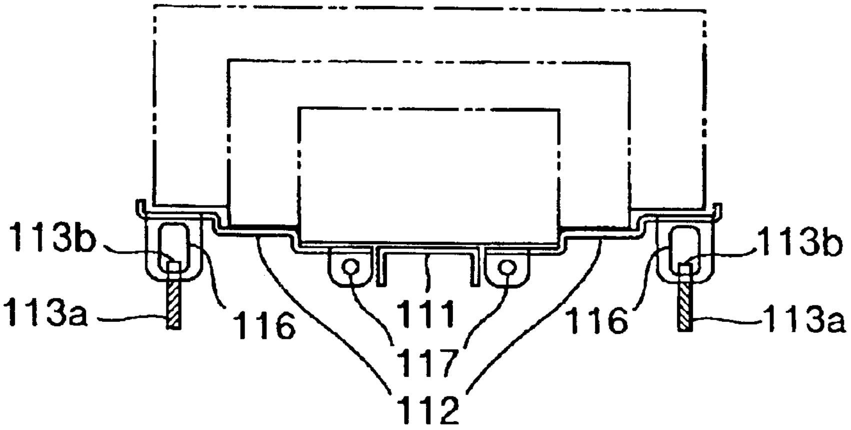
FIG. 21 is a front view illustrating the movable bottom of the banknote receipt and pay-out box which has not yet been installed on the banknote receipt and pay-out apparatus.

It is noted that a hook member 113 is urged by springs which are not shown in the direction of the arrow 114*a*, and when the receipt and pay-out box 11 is removed from the banknote receipt and pay-out apparatus 1, it is stable in the position shown in FIG. 21. Further, the movable bottoms 112 are urged by springs which are not shown, in the direction of the arrow 114*b*. The movable bottoms 112 are locked by pawls 113*a* while they are projected upward from the stationary bottom 111.

Figure 24:
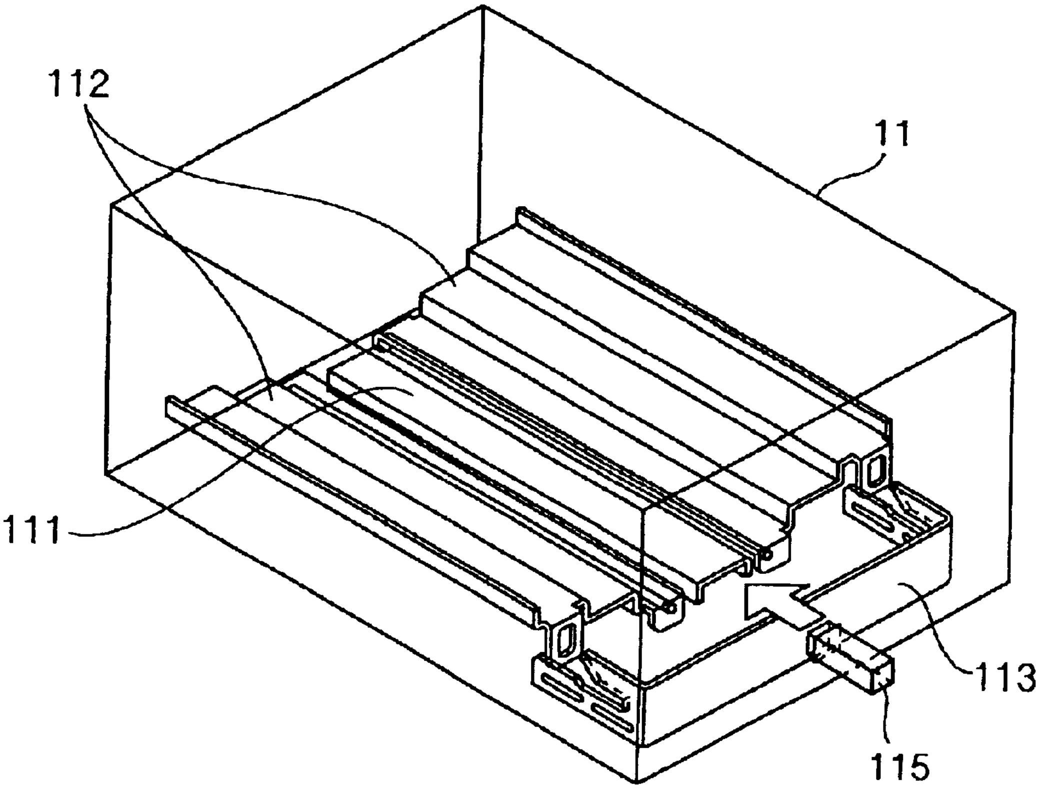
FIG. 24 is a perspective view for explaining such a condition that the banknote receipt and pay-out box is installed on the banknote receipt and pay-out apparatus.

When the receipt and pay-out box 11 is installed on the banknote receipt and pay-out apparatus 1, the installation thereof is detected by the installation detecting portion, and the movable bottoms 112 are actuated by a bottom actuating means. In this embodiment, as shown in FIG. 24, when the receipt and pay-out box 11 is installed on the banknote receipt and pay-out apparatus 1, a pusher member 115 fixed to the banknote receipt and pay-out apparatus 1 makes contact with the hook member 113 in the receipt and pay-out box 11, and accordingly, the installation of the receipt and pay-out box 11 can be mechanically detected.

Figure 22:
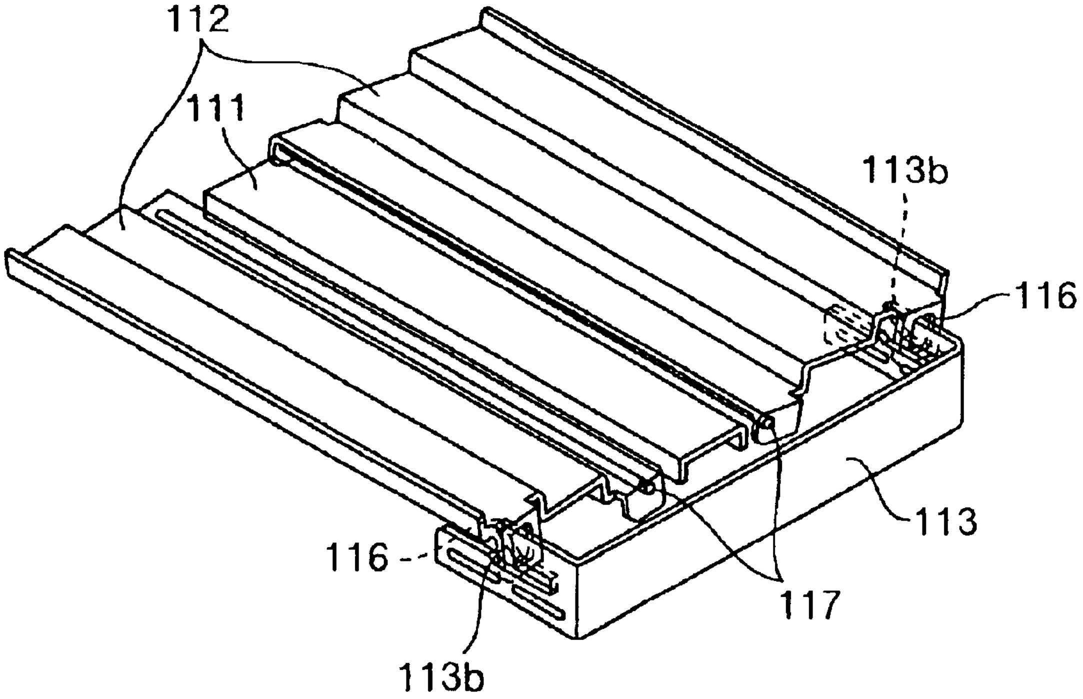
FIG. 22 is a perspective views illustrating the movable bottom of the banknote receipt and pay-out box which has been installed on the banknote receipt and pay-out apparatus.
Figure 23:
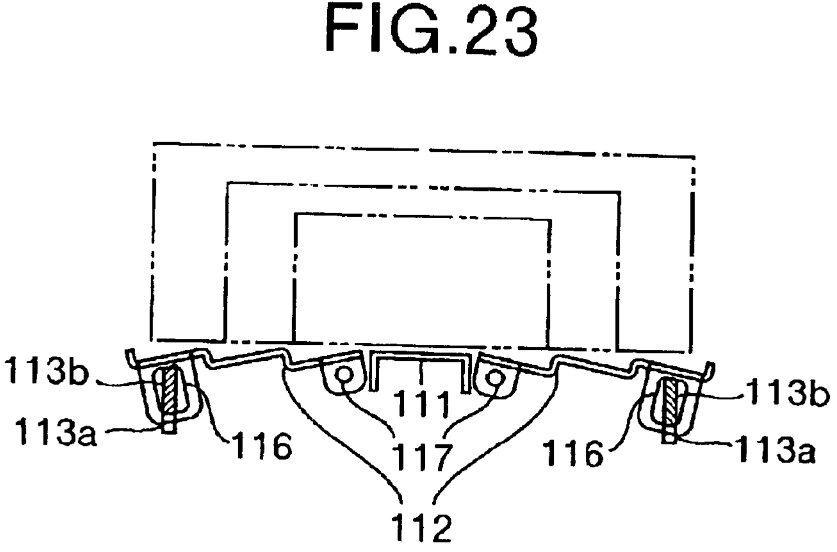
FIG. 23 is a front view illustrating the movable bottom of the banknote receipt and pay-out box which has been installed on the banknote receipt and pay-out apparatus.

Thus, this pusher mechanism 115 is a member belonging to the installation detecting portion, and when the pusher member 115 pushes the hook member 113, the movable bottoms 112 are actuated by the bottom actuating means. The bottom actuating means is composed of a pair of engaging elements which are provided around a widthwise side end part of each of the movable bottoms 112. That is, it is composed of the pawl 113*a*, 113*b* and an engaging hole 116. With this arrangement, when the hook member 13 is pushed by the pusher member 115, the pawl 113*b* is inserted into the engaging hole 116. At this stage, a tapered part of the pawl 113*b* makes contact with the perimeter of the engaging hole 116, and accordingly, and accordingly, the movable bottom 112 is turned around an axis 117. As a result, the movable bottoms 112 are retracted downward from the stationary bottom 111, as shown in FIGS. 22 and 23, and corners parts of step-like parts of the movable bottoms 112 become flush with the stationary bottom 111 so as to define a plane serving as a bottom surface. Thus, banknotes having various sizes can be taken into the receipt and pay-out box 11.

When the receipt and pay-out box 11 is again removed from the banknote receipt and pay-out apparatus 1, as shown in FIG. 20, the pawls are displaced in the direction of the arrow 114*a* by springs which are not shown, and accordingly, pawls 113*a* are locked to the movable bottoms 112 in a stable condition.

It is noted the receipt and pay-out box 11 includes a movable top panel 118 which can be displaced up and down, and accordingly, even though the movable bottoms 112 are projected upward from the stationary bottom 111 so as to raise the banknotes thereon, the banknotes can be prevented from being deformed.

It is noted that the receipt and pay-out box 11 may be used as the receipt bin 6 for storing therein received banknotes, the pay-out bin 7 for storing therein banknotes to be paid out, the banknote receipt and pay-out box 8 for storing received banknotes and paying out banknotes to be paid or the reject bin 9 for storing therein broken banknotes or the like.

As stated above, according to the present invention, the arrangement of banknotes can be held in order when banknotes having various sizes which are largely different from one another are stored in the banknote receipt and pay-out box adapted to be installed in the apparatus for dealing with banknotes having various sizes which are largely different from one another, and when the banknote receipt and pay-out box in which banknotes are set, is transported.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A banknote receipt and pay-out apparatus incorporating a receipt and pay-out box having movable bottoms on which banknotes are carried, for replenishing the apparatus with banknotes and recovering banknotes therefrom, and storing banknotes in a standing posture, the receipt and pay-out box comprising an alignment mechanism for holding the banknotes aligned in order around the widthwise center thereof when the banknote receipt and pay-out box is not installed on the banknote pay-out apparatus, the alignment mechanism being composed of an installation detecting portion for detecting the banknote receipt and pay-out box which is installed on the banknote receipt and pay-out apparatus, and a bottom actuating means for actuating the movable bottoms when the installation of the receipt and pay-out box is detected by the installation detecting portion.

2. A banknote receipt and pay-out apparatus incorporating a receipt and pay-out box for replenishing the apparatus with banknotes, recovering banknotes therefrom, and storing banknotes in a standing posture, the receipt and pay-out box incorporating a step-like movable bottom having stepped parts so as to define a recess in the center part thereof as viewed widthwise of the banknotes.

3. A banknote receipt and pay-out apparatus as set forth in claim 2, wherein the receipt and pay-out box comprises an installation detecting portion for detecting the receipt and pay-out box which is installed on the receipt and pay-out apparatus, and a bottom actuating means for actuating the movable bottom when the installation of the receipt and pay-out box is detected by the installation detecting portion.

4. A banknote receipt and pay-out apparatus as set forth in claim 3, wherein the bottom of the receipt and pay-out box is composed of a stationary bottom constituting the center part as viewed widthwise of the banknotes, and a pair of movable bottoms between which the stationary bottom is interposed, and the movable bottoms are turned each around the associated edge of the stationary bottom when the installation of the receipt and pay-out box is detected by the installation detecting portion.

5. A banknote receipt and pay-out apparatus as set forth in claim 4, wherein the bottom actuating means is composed of a pair of engaging members which are coupled to each of the movable bottoms around its side edges as viewed widthwise of the banknotes, and which are engaged with each other.

6. A banknote receipt and pay-out apparatus as set forth in claim 5, wherein the installation detecting part incorporates a pusher member fixed to the banknote receipt and pay-out apparatus, and adapted to make contact with a pawl member coupled to the engaging members so as to turn the movable bottoms.

7. The banknote receipt and pay-out apparatus incorporating a receipt and pay-out box for replenishing the apparatus with banknotes, recovering banknotes therefrom, and storing banknotes in a standing posture, the banknote receipt and pay-out box comprising an alignment mechanism for holding the banknotes aligned in order around the widthwise center thereof when the banknote receipt and pay-out box is not installed on the banknote pay-out apparatus, and a storing width adjusting means for changing the storing width of a banknote storing space.

8. A banknote receipt and pay-out apparatus as set forth in claim 7, wherein the width of the space in the receipt and pay-out box for storing banknotes is narrow when the receipt and pay-out box is not installed in the banknote receipt and pay-out apparatus, but the space in the receipt and pay-out apparatus is wide when the receipt and pay-out box is installed on the banknote receipt and pay-out apparatus.

9. A banknote receipt and pay-out apparatus as set forth in claim 7, wherein the storing width adjusting means is composed of an installation detecting means for detecting the banknote receipt and pay-out box which is installed on the banknote receipt and pay-out apparatus, and an inter side wall space width changing means for changing the width of the storing space when the installation of the receipt and pay-out box is detected by the installation detecting means.

10. A banknote receipt and pay-out apparatus incorporating a receipt and pay-out box for replenishing the apparatus with banknotes, recovering banknotes therefrom, and storing banknotes in a standing posture, an installation portion on which the receipt and pay-out box is installed, a storing width changing means for changing the width of a storing space in the receipt and pay-out box, the storing width adjusting means comprising an installation detecting means for detecting the receipt and pay-out box which is installed on the banknote receipt and pay-out apparatus, and an inter-side wall space width changing means for changing the storing width when the installation of the receipt and pay-out box is detected by the installation detecting means, the installation detecting means comprising a contact member adapted to make contact with a contact portion provided in the installation portion, and the inter-side wall space width changing means incorporating movable side walls which can change the width of the storing space when the installation is detected by the installation detecting means.

11. A banknote receipt and pay-out apparatus as set forth in claim 10 wherein the contact member is movable and is coupled to the movable side wall.

12. A banknote receipt and pay-out apparatus as set forth in claim 11, wherein the contact member is provided so as to be rotatable around the an axis in the banknote stacking direction of the receipt and pay-out box, and is pressed against the contact portion so as to be rotated around the axis.

* * * * *